United States Patent Office 3,338,234
Patented Aug. 29, 1967

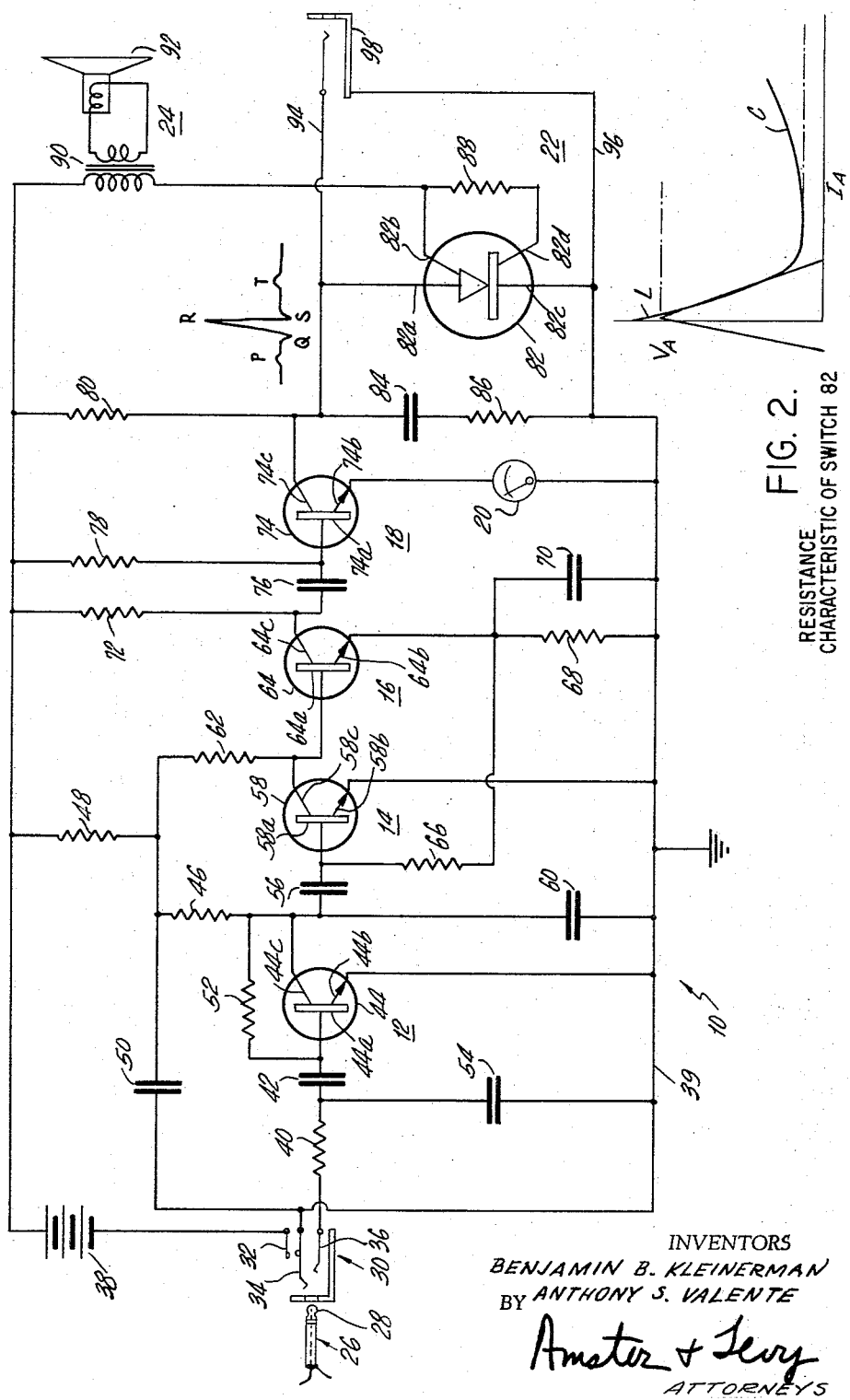

3,338,234
HEART ACTIVITY DETECTOR AND DISPLAY DEVICE
Benjamin B. Kleinerman, 1760 Stewart Ave., New Hyde Park, N.Y. 11040, and Anthony S. Valente, 63 Harbor Lane, Massepequa Park, N.Y. 11762
Filed June 9, 1964, Ser. No. 391,058
(Filed under Rule 47(b) and 35 U.S.C. 118)
7 Claims. (Cl. 128—2.06)

ABSTRACT OF THE DISCLOSURE

The invention is a miniature cardiac-activity sensor capable of providing audible and visual indications of heart activity. An amplifier connected to a visual indicator responds to the application of heartbeat signals to operate the visual device. The audible output is obtained from a tone generator connected to a speaker. The output of the amplifier is connected to the generator, and the application of a heartbeat signal to the amplifier changes the state of the amplifier and causes it to turn on the generator. Thus, during the application of a heartbeat signal a train of pulses is delivered through the speaker to produce the audible output.

---

The present invention relates generally to a heart activity detector and indicator, and in particular to a portable device for the audible and visual observation of heart activity, and in particular, heartbeat.

Various types of electrocardiographs are available for the visual display of heart activity. Although attempts have been made to miniaturize such devices and render the same portable, as for example by employing transistors in the several stages of amplification and a battery power supply, there exists a need for a cardiac-activity sensor which is capable of providing an audible and visual indication of heart activity which is particularly suitable for emergency use in the field. On a day-to-day basis, doctors and rescue workers are often faced with the difficult task of determining whether or not first aid and/or resuscitation procedures have any hope of success on an injured person or persons. This determination becomes critical in a common disaster where limited personnel are available for treating the injured and it is difficult to segregate those who could be possibly saved by emergency procedures from those who are beyond help. There exists the need for a compact heart activity indicator which preferably can be carried about in the pocket of a rescue worker, physician or the like and which will produce audible sounds at the repetition rate and rhythm of the patient and a visual display which tracks the wave form of the heart activity.

Another important problem confronting workers in this field is the determination of fibrillation of the heart which is a definite indication of impending death. Auricular fibrillation or muscular tremor is a rapid twitching of the muscular wall of the auricle of the heart taking the place of the systole. A systole is the beat of the heart contraction. A systole is not appreciable through the pulse because of the mitral regurgitation. Ventricular fibrillation is the irregular twitch of the wall of the ventricle of the heart which is the contraction of the ventricles by which the blood is usually forced into the aorta and pulmonary artery. It is generally known that a stethoscope cannot pick up fibrillation or muscular tremor. The ability to sense such fibrillation is a vital diagnostic tool and serves importantly in the ability to restore normal heart function because fibrillation will, in most instances, cause the heart function to become completely exhausted and never resume normal function. However, if fibrillation can be promptly detected, the physician can stop the heart immediately and prior to the exhaustion period and restimulate the heart function in its normal mode, with the ultimate result of saving the patient's life.

Broadly, it is an object of the present invention to provide an improved cardiac activity sensing unit which realizes one or more of the aforesaid objectives. Specifically, it is within the contemplation of the present invention to provide a portable device for the audible and visual observation of heart activity which provides sounds at a repetition rate and rhythm synchronous with the heartbeat, and a visual indication which tracks the wave form of the heart activity, including amplitude variations and fibrillation thereof.

In accordance with an illustrative embodiment demonstrating objects and features of the present invention, there is provided a portable device for the audible and visual observation of heartbeat activity which comprises a direct current battery power supply, signal-input means adapted to derive heartbeat signals from a patient, transistorized amplification means energized from the power supply, and an input circuit connected to the amplification means and to the signal-input means for applying the heartbeat signals to the amplification means. In a typical illustrative embodiment, the amplification means is in the form of plural stages of amplification each including a transistor connected in one of the usual configurations for amplification. A tone generator is connected to the final stage of amplification for providing a train of pulses at a repetition rate and rhythm synchronous with a selected peak of successive amplified heartbeat signals and a substantially constant amplitude. In the usual heartbeat signal, the so-called "R" peak is of the largest magnitude. Accordingly, in a typical device, it is the "R" peak which is selected to establish the train of pulses at the repetition rate and rhythm of the detected heart signal. Audio output means, usually in the form of a speaker, is connected to the tone generator for providing audible beats at the repetition rate. Visual output means, usually in the form of a meter, is connected to the final stage of amplification to provide a visual display which tracks the wave form of the amplified heart signals, including amplitude variations and fibrillations thereof. Advantageously, the entire system may be fitted into a case which is approximately the size of a package of cigarettes such that it may be carried about with no difficulty whatsoever. Signals are derived from the body by two electrodes of the type usually employed in electrocardiography studies, with the electrodes being readily portable as well.

With the cardiac sensing and display device of the present invention, the physician or rescue worker can readily an accurately determine whether or not there is any heart activity, the nature of the activity including a comparative indication of its intensity and rhythm, and the presence or absence of fibrillation. Individually and collectively, such diagnostic aids enable the physician to determine whether there is any purpose whatsoever in treating the patient, and if so what procedures are required.

The above brief description, as well as further objects and features of the present invention will be more fully appreciated by reference to the following detailed description of a presently preferred, but nonetheless illustrative, embodiment in accordance with the present invention, when taken in conjunction with the accompaying drawings, wherein:

FIG. 1 is a schematic view of a portable device for the audible and visual observation of heart activity embodying features of the present invention; and FIG. 2 is a graph which facilitates an understanding of the details of the tone generator incorporated in the present device.

Referring now specifically to FIG. 1 of the drawings, there is shown a heart activity sensing and display device embdoying features of the present invention and generally designated by the reference numeral 10. In general, the device 10 includes four stages of amplification, designated by the reference numerals 12, 14, 16 and 18, a meter 20 connected to the output of the last stage 18 of amplification which directly provides a visual indication which will exactly follow the wave form of the heartbeat including any tendency for fibrillation, a tone generator 22 which provides a train of pulses at a repetition rate and rhythm synchronous with the "R" peak of the heartbeat wave and of substantially constant amplitude, and an audio output 24 which provides a series of beat at said repetition rate and rhythm. The instant cardiac amplification and display device is suitable to pick up signals derived from the heart of the order of one millivolt or possibly less and produce a gain of the order of 200 or more.

A signal indicative of heart activity is derived with the use of essentially conventional electrodes which are designed with reservoirs for the required saline solution or paste such as to establish good contact with the skin of the patient for relatively long periods of time, as may be required for rescue or resuscitation work. The signals thus derived are applied via a signal-input lead 26 which terminates in a plug 28 to the input circuit associated with the first stage 12 of amplification. The input circuit includes a jack 30 having resilient contacts 32, 34, 36. Contact 32 is connected to the negative terminal of a direct current battery supply 38, while contact 34 is connected to ground lead 39. Contact 36 is connected via resistor 40 and coupling capacitor 42 to the base 44a of transistor 44 in the first stage 12 of amplification. Upon insertion of the plug 28 of the input lead 26 into the jack 30, a ground circuit will be completed for the direct current battery power supply 38 via contact pair 32, 34; and simultaneously signal input will be applied to the base 44a of the first stage 12 of amplification by resistor 40 and coupling capacitor 42. Resistor 40 is provided in the input circuit to preclude the possibility of too low an impedance in the base circuit of transistor 44 which might result from a low order of skin resistance, as for example if the doctor inserted the sensing electrode under the skin.

Turning now to the details of the first stage 12 of amplification, it will be seen that the emitter 44b of the transistor 44 is grounded, while the collector 44c is connected via collector resistor 46 and the decoupling resistor 48 to the positive terminal of the direct current power supply 38. Capacitor 50 is connected between the contact 34 and the junction of the collector resistor 46 and the decoupling resistor 48 and, in conjunction with decoupling resistor 48, affords decoupling and isolation, as is generally understood. Resistor 52 is connected between the collector 44c and the base 44a to provide the necessary bias, while a high frequency bypass capacitor 54 is connected between the junction of the resistor 40 and the coupling capacitor 42 and to ground lead 39 to afford a low impedance path to ground for high frequency signals and spurious ambient noise which might provide a false indication in the device of heartbeat activity. Of course the capacitance of the high frequency bypass capacitor 54 is selected to avoid bypassing usable signals to ground.

The output derived from the collector 44c of the transistor 44 in the first stage of amplification is applied to the second stage of amplification by a coupling capacitor 56 which is connected directly between the collector 44c of transistor 44 and base 58a of transistor 58 in the second stage 14 of amplification. The junction of the coupling capacitor 56 and the collector 44c is connected to ground lead 39 via the high frequency bypassing capacitor 60 to eliminate spurious high frequency signals. The emitter 58b of transistor 58 is connected to the ground lead 39, while the collector 58c is connected over collector resistor 62 and the decoupling resistor 48 to the positive side of the direct current power supply 38.

Stage 16 of amplification includes a transistor 64 which has its base 64a connected directly to the collector 58c of stage 14 to preclude attenuation of the desired low frequency signals indicative of heart activity. The emitter 64b of transistor 64 is connected to the junction of resistors 66, 68, with resistor 66 being connected to the base 58a of the transistor 58 in stage 14 and the resistor 68 being connected to the ground lead 39. The connection between the emitter 64b and base 58a via resistor 66 will be recognized as providing a feed back circuit for temperature stabilization. Capacitor 70 is connected to the junction of resistors 66, 68 and to ground to provide an effective short at audio frequencies which thereby ground the emitter 64b of transistor 64. The collector 64c is connected to the direct current power supply 38 via collector resistor 72.

The last stage 18 of amplification includes transistor 74 which has its base 74a connected via coupling capacitor 76 to the collector 64c of transistor 64 of stage 16. The meter 20, which provides a visual display of the heartbeat activity, is connected between the emitter 74b of transistor 74 and ground lead 39. This is a convenient way for providing the ground connection to the meter 20 and input thereto from the final stage 18 of amplification. The needle of meter 20 will respond to heartbeat activity which will usually be in the form illustrated opposite the output of stage 18. Bias potential is applied to the base 74a of transistor 74 via base resistor 78 connected to the positive terminal of the direct current power supply 38, while the collector 74c derives its potential over collector resistor 80. Although the meter 20 has been shown connected in the emitter circuit of transistor 74, it could be as well connected in the collector circuit and also derive an amplified signal which precisely follows the waveform of the heartbeat.

Having derived a signal which is applied to the meter 20 and will precisely follow the heartbeat, the invention also contemplates the provision of audible beats at a repetition rate and rhythm determined by the dominant or fundamental peak of the heartbeat wave, which is the so-called "R" peak shown in the illustrative waveform. This is achieved by employing the tone generator 22 which incorporates a silicon-controlled switch 82 having an anode 82a, an anode gate 82b, a cathode 82c and a cathode gate 82d. Connected in the collector output circuit of transistor 74 and across the anode 82a and the cathode 82c are a series charging capacitor 84 and time delay resistor 86. The anode gate 82b is connected to the cathode gate 82d via intergate resistor 88 and the anode gate 82b is connected to the primary of the audio transformer 90 in the audio output 24, the secondary thereof being connected to the coil of the speaker 92 in the conventional fashion.

The tone is generated by the capacitor 84, charging and then discharging through the silicon-controlled switch 82. Looking into the anode 82a of the silicon-controlled switch, the same has a negative resistance characteristic as shown in FIG. 2 and designated by the letter C. To assure oscillation of the tone generator 22, the anode load line L must intersect the characteristic C only in the negative resistance region. When the capacitor 84 is charging, the anode junction is reversed biased so that it can be effectively ignored and the intergate resistor 88 supplies trigger bias to the cathode gate 82d and lowers the voltage at the anode gate 82b below the supply voltage due to transformer resistance. When the capacitor 84 charges enough to raise the anode voltage above the anode gate voltage, regeneration causes the silicon-controlled switch 82 to turn on, discharging the capacitor 84 through the switch 82. In a typical circuit the anode voltage drops within one volt of ground as does the voltage at the anode gate 82b. The intergate resistor 88 no longer supplies trigger current to the cathode gate 82b but rather reversely biases it such that the silicon-controlled switch turns off. The voltage at the anode gate rises rapidly to the supply voltage, or overshoots the same depending upon transformer characteristics and the anode junction rises by charging of the capacitor 84 in the next cycle. The resistor 86 in series with capacitor 84 effectively increases the discharge time of the capacitor 84 which in turn results in more energy being supplied to the audio transformer 90. In this specific illustrative embodiment, the last transistor stage, while conducting, holds the anode voltage at the anode junction 82a below that of the voltage at the anode gate 82b. However, input to the last stage 18 of amplification completely turns the stage off permitting the tone generator 22 to oscillate and provide the desired audio output. Although the described tone generator has been found to be particularly suitable for the instant purpose and in a practical application can be fabricated in a single unit along with the several stages of amplification, it will be appreciated that other tone generators which provide a train of audio pulses at substantially uniform amplitude will be suitable to activate the audio output 24.

Since the capacitor 84 is charging as a function of the wave form of the heartbeat, it is possible to tap across the capacitor 84 and the time delay resistance 86 via output leads 94, 96 connected to an output jack 98 and provide an output signal at the jack 98 which may be fed as input to an oscilloscope, pen writer or similar recording device.

By appropriate design and selection of the circuit parameters, it is possible to derive an audio output via the speaker 92 and a visual display via the meter 20 or other similar device which will provide audible and visual indications respectively of heartbeat activities. Fibrillation will manifest itself as spurious and erratic movement of the needle of the meter 20, as compared to movement which would normally track the illustrated waveform of a typical heartbeat.

From the foregoing, it will be appreciated that there has been provided a relatively compact and easy to use diagnostic device for determining the presence and character of heartbeat activity. The components employed in the device are exceptionally rugged and virtually foolproof operation is assured over prolonged periods of use, with the occasional need to replace the battery.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What we claim is:

1. A portable device for the audible observation of heart activity comprising a direct current battery power supply, signal-input means adapted to derive heartbeat signals form a patient, transistorized amplification means energized from said power supply, an input circuit connected to said amplification means and to said signal-input means for applying said heartbeat signals to said amplification means, a tone generator connected to said amplification means and responsive to the application of a heartbeat signal to said amplifications means for providing a train of pulses at a repetition rate and rhythm synchronous with a selected peak of successive amplified heartbeat signals and of substantially constant amplitude, and audio output means connected to said tone generator for providing audible beats at said repetition rate.

2. A portable device for the visual observation of heart activity comprising a direct current battery power supply, signal-input means adapted to derive heartbeat signals from a patient, transistorized amplification means energized from said power supply, an input circuit connected to said amplification means and to said signal-input means for applying said heartbeat signals to said amplification means, audible means connected to said amplification means and responsive to the application of a heartbeat signal to said amplification means for providing a train of audible pulses at a repetition rate and rhythm synchronous with a selected peak of successive amplified heartbeat signals and of substantially constant amplitude, and visual output means connected to said amplification means for providing a visual display which tracks the wave form of said amplified heartbeat signals including amplitude variations and fibrillation thereof.

3. A device for the audible and visual observation of heart activity comprising a power supply, signal-input means adapted to derive heartbeat signals from a patient, amplification means energized from said power supply, an input circuit connected to said amplification means and to said signal-input means for applying said heartbeat signals to said amplification means, a tone generator connected to said amplification means and responsive to the application of a heartbeat signal to said amplification means for providing a train of pulses at a repetiton rate and rhythm synchronous with a selected peak of succesive amplified heartbeat signals and of substantially constant amplitude, audio output means connected to said tone generator for providing audible beats at said repetition rate, and visual output means connected to said amplification means for providing a visual display which tracks the wave form of said amplified heartbeat signals including amplitude variations and fibrillation thereof.

4. A portable device for the audible and visual observation of heart activity comprising a direct current battery power supply, signal-input means adapted to derive heartbeat signals from a patient, transistorized amplification means energized from said power supply, an input circuit connected to said amplification means and to said signal-input means for applying said heartbeat signals to said amplification means, a tone generator including a silicon-controlled device connected to said amplification means and responsive to the application of a heartbeat signal to said amplification means for providing a train of pulses at a repetition rate and rhythm synchronous with a selected peak of successive amplified heartbeat signals and of substantially constant amplitude, audio output means connected to said tone generator for providing audible beats at said repetition rate, and visual output means connected to said amplification means for providing a visual display which tracks the wave form of said amplified heartbeat signals including amplitude variations and fibrillation thereof.

5. A device for the audible observation of heart activity comprising power supply, a signal-input lead terminating in a plug and adapted to derive heartbeat signals from a patient, plural transistorized stages of amplification, an input circuit including a jack and plural contacts connected to said power supply and to the first of said stages of amplification and arranged in response to insertion of said plug into said jack to complete a circuit for said power supply and to apply said heartbeat signals to said first stage of amplification, a tone generator connected to the final stage of amplification and responsive to the application of a heartbeat signal to the first of said stages of amplification for providing a train of pulses at a repetition rate and rhythm synchronous with a selected peak of successive amplified heartbeat signals and of substantially constant amplitude, and audio output means connected to said tone generator for providing audible beats at said repetition rate.

6. A portable device for the visual observation of heart activity comprising a direct current battery power supply, a signal-input lead terminating in a plug and adapted to derive heartbeat signals from a patient, plural transistorized stages of amplification, an input circuit including a jack and plural contacts connected to said power supply and to the first of said stages of amplification and arranged in response to insertion of said plug into said jack to complete a ground circuit for said power supply and to apply said heartbeat signals to said first stage of amplification, audible means connected to the final stage of amplification and responsive to the application of a heartbeat signal to the first of said stages of amplification for providing a train of audible pulses at a repetition rate and rhythm synchronous with a selected peak of successive amplified heartbeat signals and of substantially constant amplitude, and visual output means connected to said final stage of amplification for providing a visual display which tracks the wave form of said amplified heartbeat signals including amplitude variations and fibrillation thereof.

7. A portable device for the audible and visual observation of heart activity comprising a direct current battery power supply, a signal-input lead terminating in a plug and adapted to derive heartbeat signals from a patient, plural transistorized stages of amplification, an input circuit including a jack and plural contacts connected to said power supply and to the first of said stages of amplification and arranged in response to insertion of said plug into said jack to complete a ground circuit for said power supply and to apply said heartbeat signals to said first stage of amplification, a tone generator connected to the final stage of amplification and responsive to the application of heartbeat signal to the first of said stages of amplification for providing a train of pulses at a repetition rate and rhythm synchronous with a selected peak of successive amplified heartbeat signals and of substantially constant amplitude, audio output means connected to said tone generator for providing audible beats at said repetition rate, and visual output means connected to said final stage of amplification for providing a visual display which tracks the wave form of said amplified heartbeat signals including amplitude variations and fibrillation thereof.

References Cited

UNITED STATES PATENTS

| | | | |
|---|---|---|---|
| 3,027,891 | 4/1962 | Fields et al. | 128—2.06 |
| 3,195,534 | 7/1965 | Bethke | 128—2.06 |

RICHARD A. GAUDET, *Primary Examiner.*

SIMON BRODER, *Examiner.*